United States Patent
Joseph et al.

(10) Patent No.: US 7,184,469 B2
(45) Date of Patent: Feb. 27, 2007

(54) SYSTEMS AND METHODS FOR INJECTION OF TEST JITTER IN DATA BIT-STREAMS

(75) Inventors: Francis Joseph, Sunnyvale, CA (US); Klaus D. Hilliges, Mountain View, CA (US); Cheryl L. Owen, Cupertino, CA (US)

(73) Assignee: Verigy Pte. Ltd., Singapore (SG)

( * ) Notice: Subject to any disclaimer, the term of this patent is extended or adjusted under 35 U.S.C. 154(b) by 770 days.

(21) Appl. No.: 10/360,159

(22) Filed: Feb. 6, 2003

(65) Prior Publication Data

US 2004/0156429 A1    Aug. 12, 2004

(51) Int. Cl.
H04B 3/46    (2006.01)
H04B 17/00    (2006.01)
H04Q 1/20    (2006.01)

(52) U.S. Cl. ...................... 375/224; 375/226
(58) Field of Classification Search ................ 375/224, 375/226, 318, 371, 516; 327/307, 158, 218; 702/69

See application file for complete search history.

(56) References Cited

U.S. PATENT DOCUMENTS 6,466,072 B1 * 10/2002 Mar .......................... 327/280
6,847,232 B2 * 1/2005 Tinsley et al. ................ 326/84
6,958,640 B2 * 10/2005 Lee et al. .................... 327/261

FOREIGN PATENT DOCUMENTS

EP    01108337.5    4/2001

OTHER PUBLICATIONS

Svensson, Christer and Mu Fenghao, "Vector Transfer by Self-Tested Self-Synchronization for Parallel Systems", 1999 IEEE Transactions on Parallel and Distributed Systems, (Aug. 1999), vol. 10, No. 8, pp. 769-779.
Svensson, Christer and Mu Fenghao, "Self-Tested Self-Synchronization by a Two-Phase Input Port", 1998 IEEE IFM, Linkoping University, S-58183 Linkoping, Sweden.
Svensson, Christer and Mu Fenghao, "Self-Synchronized Vector Transfer for High Speed Parallel Systems", IFM, Linkoping University, S-58183 Linkoping, Sweden.
Laquai, Bernd and Yi Cai, "Testing Gigabit Multilane SerDes Interfaces with Passive Jitter Injection Filters", 2001 IEEE ITC International Test Conference, Paper 11.1, pp. 297-304.
Reinhardt, Victor S., Spur Recuction Techniques in Direct Digital Synthesizers, 1993 IEEE International Frequency Control Symposium, pp. 230-241.

* cited by examiner

Primary Examiner—Chieh M. Fan
Assistant Examiner—Nader Bolourchi

(57) ABSTRACT

A method for injecting test jitter in a data bit stream comprises modulating first and second voltage generators to control a rise and fall times of an output signal, respectively. A pair of input voltages are received by a differential pair. At least one current sink device is operated using a first control voltage provided by at least one of the voltage generators to provide an output voltage in response to the input voltages received by the differential pair. A plurality of current sources are operated to provide the output signal using a reference voltage provided by one of the voltage generators in response to the input voltages received by the differential pair, wherein simultaneous variation of the rise and fall times together with the input voltages define the output signal and jitter output by the current sink device and the current sources.

37 Claims, 3 Drawing Sheets

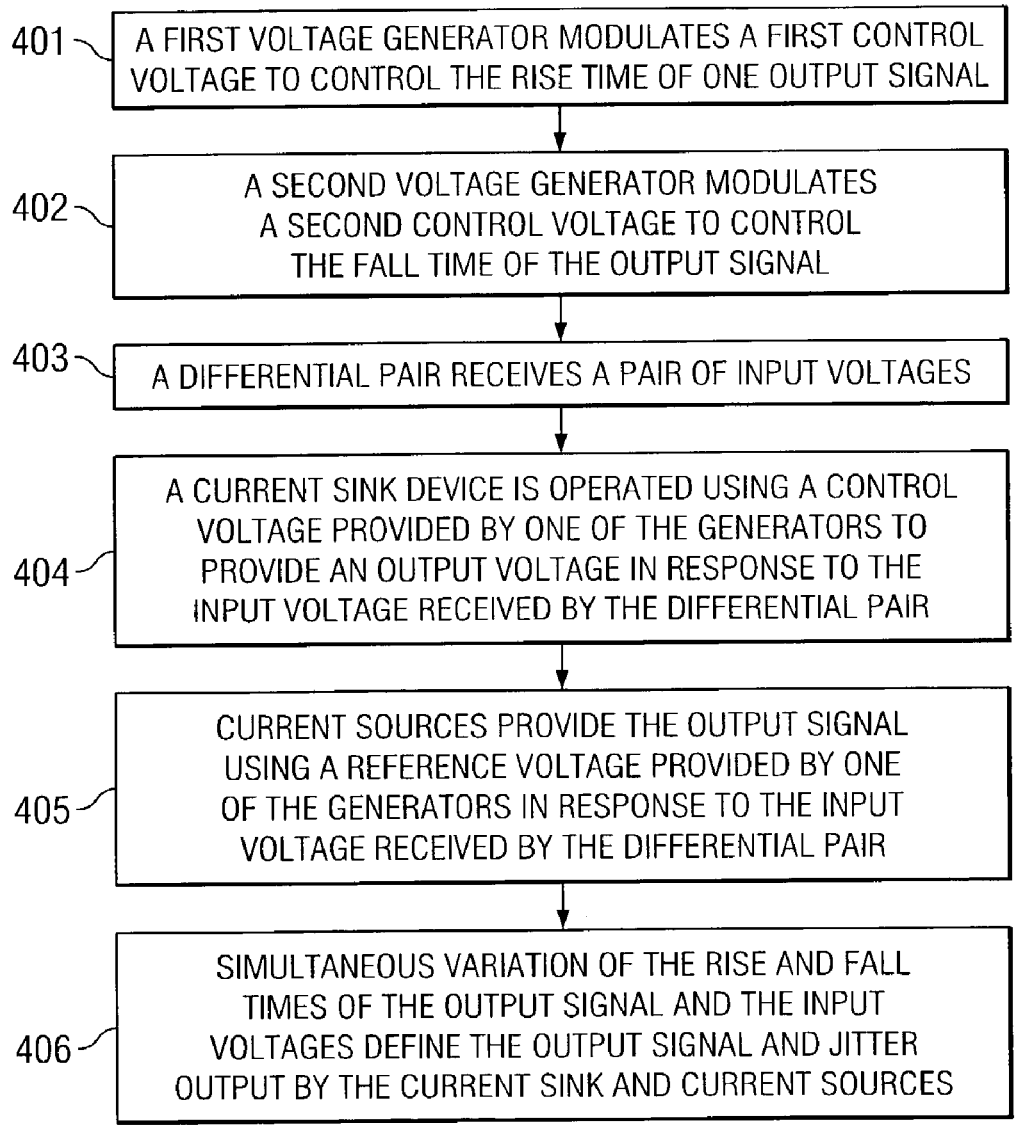

SYSTEMS AND METHODS FOR INJECTION OF TEST JITTER IN DATA BIT-STREAMS

FIELD OF THE INVENTION

The present invention is generally related to digital circuits and specifically related to systems and methods for injection of test jitter in data bit-streams.

BACKGROUND OF THE INVENTION

As data rates for new generation integrated circuits (ICs) continue to increase, the amount of a type of noise known as jitter in a data stream is becoming an important factor in the quality of data output. As used herein, jitter may be defined as uncertainties in the relative position of data transitions relative to a fixed reference edge. The number of applications for high speed interfaces have increased. Resultantly, a signal is typically sent over several different networks before reaching its destination. As a signal goes through each of these networks, jitter is introduced into the data stream. When this data reaches the intended receiver, even though the data stream began as a clean signal, it ends up as a dirty signal. Even though data streams with very low jitter may be generated, the amount of jitter in the received data stream may be quite large. This results when data output from a transmitter transits through different devices, each of these devices will, in turn, introduce one or another type of jitter into the data stream. Thus, data received by the target receiver may have different amounts of jitter, depending on the path the data took, the type of data pattern and/or other factors. So, when jitter levels in a data stream are high and the performance of the receiver is relatively marginal to begin with, the receiver may not function properly.

There are several types of existing jitter injection modules (JIMs). JIMs are intended to introduce jitter in the output data of a transmitter of a high speed data stream, simulating a data communication environment. An existing JIM may be a stand-alone module or may be a module embedded in an IC design.

In order to introduce jitter in a transmitted data stream, an existing external JIM may be inserted between a transmitter and a receiver. However, existing external JIMs have several disadvantages. When there are multiple high speed data channels in an IC, each of these channels requires its own separate JIM. Also, existing JIMs do not have a provision to introduce jitter in a controllable manner, in such a manner as to control the amount of jitter or to provide a variety of different types of jitter. For external JIMs, with, for example, a co-located transmitter and receiver, an external loop back may be used to introduce jitter. For an internal loop back, there is no existing manner to create jitter to measure quality of the receiver.

An existing embedded JIM is typically inserted in the path of a high speed clock or the data path. This method is an invasive manner for accomplishing jitter injection into a data stream. This technique also has disadvantages. Any module connected to a high throughput, or high bit rate, data stream has a potential to degrade the performance of a transmitter connected thereto. Hence, an IC embedded JIM is not a preferred method to inject jitter in the transmitted data stream. In an IC there are typically multiple high speed data channels. Therefore, an embedded JIM module must be incorporated in each of the transmitter channels, which will be a significant waste of physical IC space.

BRIEF SUMMARY OF THE INVENTION

The present invention is directed to systems and methods that provide a non-invasive design for test approach by which jitter may be injected into a data stream in a controlled manner to study the effects of jitter on the performance of a receiver of a data stream.

In order to test receiver ICs the present invention provides systems and methods by which jitter may be introduced in a high speed data stream, in a controlled and non-invasive manner at a very low cost. Artificially introducing jitter enables measurement of the quality of a receiver, either receiving the signal or incorporated into the IC in accordance with embodiments of the present invention. Specifically, the present invention solves the aforedescribed problems in that it is incorporated into the transmitter IC itself, enabling low cost introduction of jitter to measure quality of a receiver, whether used in an internal loop back or an external loop back configuration. Examples of broadband applications which may advantageously employ the present invention include Fiber Channel, Gigabit Ethernet and new generation interfaces for third generation input/output (3GI/O) wireless hardware.

Advantageously, the present invention does not require any external or internal modules to inject jitter into a high speed data stream. Jitter is introduced in the data stream by modulating reference voltages of source and/or sink current generators typically present in ICs that are susceptible to the effects of jitter, such as high speed data transmitter ICs, and the like. Also, the present invention enables characteristics of the injected jitter to be controlled. For example, a desired amount of jitter to be introduced and a desired amplitude for this jitter to be selected. Furthermore, in accordance with the present invention, a desired type of jitter can be introduced. Such types of jitter may include in-band or out-of-band jitter, sinusoidal wave form jitter, pattern dependent jitter, phase dependent jitter, interference dependent jitter, or other types of jitter known to those skilled in the art. As a further advantage, jitter may be selectively introduced in any, or all, of the multiple high speed data channels in an IC, in accordance with the present invention.

An embodiment of a method for injecting test jitter in a data bit stream comprises modulating first and second voltage generators to control a rise and fall times of an output signal, respectively. A pair of input voltages are received by a differential pair. At least one current sink device is operated using a first control voltage provided by at least one of the voltage generators to provide an output voltage in response to the input voltages received by the differential pair. A plurality of current sources are operated to provide the output signal using a reference voltage provided by one of the voltage generators in response to the input voltages received by the differential pair, wherein simultaneous variation of the rise and fall times together with the input voltages define the output signal and jitter output by the current sink device and the current sources.

An embodiment of a system for injecting test jitter in one or more independent data bit streams, the system comprises at least one modulator and a plurality of data bit stream generators each of the generators modulated by at least one of the modulators. A differential pair has a first output of the differential pair controlled by a first input voltage. A second output of the differential pair is controlled by a second input voltage. A current sink device for each data bit stream is operated by a first control voltage provided by a first of the voltage generators. Each current sink device provides an output voltage in response to the input voltages provided to the differential pair. A plurality of current source devices are controlled by a second control voltage provided by a second of the voltage generators. Each of the current sources provide an output voltage in response to the input voltages provided to the differential pair. Each current source and each current sink device provide an output voltage in response to the input voltages provided to the differential pair. Simultaneous variation of the first and second control voltages in combination with the input voltages defines an output signal and jitter.

An embodiment of a circuit adapted to inject test jitter in one or more independent data bit streams comprises at least one modulator and a plurality of data bit stream generators each of the generators modulated by at least one of the modulators. An output buffer of the circuit comprises a differential pair with a first output of the differential pair controlled by a first input voltage and a second output of the differential pair controlled by a second input voltage. A current sink device in the output buffer for each data bit stream is operated by a first control voltage provided by a first of the voltage generators. Each current sink device provides an output voltage in response to the input voltages provided to the differential pair. A plurality of load capacitors in the output buffer each receive, store and discharge one of the output voltages. A plurality of output buffer current source devices are controlled by a second control voltage provided by a second of the voltage generators. Each of the current sources provides an output voltage in response to the input voltages provided to the differential pair. Each current source and each current sink device provide an output voltage in response to the input voltages provided to the differential pair. Simultaneous variation of the first and second control voltages in combination with the input voltages defines an output signal and jitter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 is a flow chart of a method of jitter injection in a data bit stream in accordance with an embodiment of the present invention.

DETAILED DESCRIPTION

Figure 1:
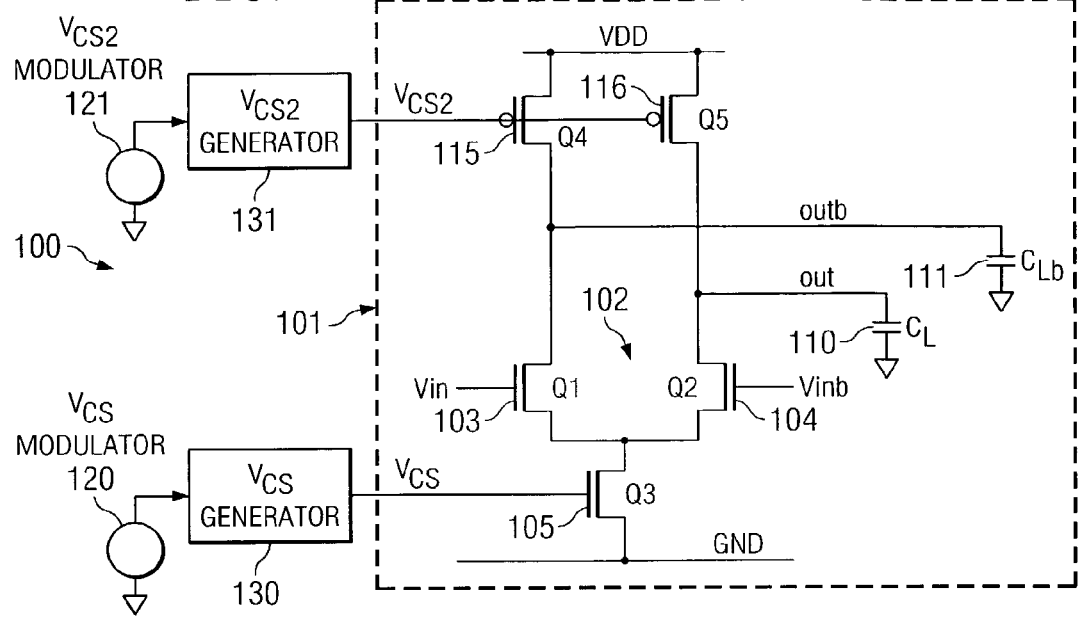
FIG. 1 is a partial schematic of a common mode logic (CML) circuit differential output employing an embodiment of the present jitter injection system and method.

Turning to FIG. 1, a partial schematic of a common mode logic (CML) circuit differential output 100 employing an embodiment of the present jitter injection system is illustrated. In high speed transmitters, data is typically moved from one point to another in differential output format. These differential outputs are generated using differential transistor pairs made up of metal oxide semiconductor (MOS), common mode logic (CML) or other types of differential output buffers. An example of such a differential output is shown by box 101 in FIG. 1.

Reference signal voltage $V_{CS}$ in FIG. 1 determines the amount of current that will be provided for differential transistor pair 102, Q1 (103) and Q2 (104). This may be represented by the formula:

$$I_{cs} = \frac{\beta}{2} * (V_{cs} - V_t)^2 \qquad \text{for } 0 < V_{cs} - V_t < V_{ds} \tag{Eq. 1}$$

where $I_{CS}$ is the current that flows from the drain to the source of current sink transistor Q3 (105). Current sink Q3 (105) synchronizes the current provided by Q1 (103) and Q2 (104). $\beta$ is the MOS transistor gain factor; $V_{CS}$ is the gate voltage for transistor Q3 (105); $V_t$ is the threshold voltage; and $V_{ds}$ is the drain source voltage of current sink transistor Q3 (105). Given that $I_{cs}$ is a function of the gate voltage $V_{CS}$ as given by Eq. 1 and depicted in FIG. 3, the value of $I_{cs}$ can be controlled by changing the value of gate voltage $V_{CS}$.

Transistor differential pair 102, Q1 (103) and Q2 (104), has two inputs, $V_{in}$ and $V_{inb}$. Due to the nature of the configuration of the differential inputs, when $V_{in}$ is logically high, then $V_{inb}$ is logically expected to be at a logically low state. Conversely, when $V_{inb}$ is high, $V_{in}$ is expected to be low.

In a typical IC application, the two differential outputs, $V_{out}$ and $V_{outb}$, are connected to respective differential inputs of a receiver. The input loads of the receiver including the loads from each of the outputs, $V_{out}$ and $V_{outb}$, may be represented by capacitive loads, $C_L$ and $C_{Lb}$ as shown at capacitors 110 and 111 in FIG. 1. The voltage across these load capacitances, $C_L$ and $C_{Lb}$ can be represented by:

$$Q = C_L * V_{out} \tag{Eq. 2}$$

$$Q_b = C_{Lb} * V_{outb} \tag{Eq. 2a}$$

where $V_{out}$ and $V_{outb}$ are the voltage across the capacitances, $C_L$ and $C_{Lb}$.

If capacitors $C_L$ and $C_{Lb}$ are allowed to charge for t seconds, then the charge accumulated by the capacitors $C_L$ and $C_{Lb}$ could be represented by:

$$Q = I * t \tag{Eq. 3}$$

$$Q_b = I_b * t \tag{Eq. 3a}$$

where I and $I_b$ are the currents flowing into the capacitors $C_L$ and $C_{Lb}$. Hence, equations, Eq. 2 and Eq. 2a may be rewritten as:

$$I*t = C_L * V_{out} \qquad \text{(Eq. 4)}$$

$$I_b*t = C_{Lb} * V_{outb} \qquad \text{(Eq. 4a)}$$

where I and $I_b$ are the currents flowing into the capacitors $C_L$ and $C_{Lb}$ and t is the time taken to charge capacitors $C_L$ and $C_{Lb}$ to respective voltages $V_{out}$ and $V_{outb}$. Given that $C_L$ and $C_{Lb}$ are constants and if the value of $V_{out}$ and $V_{outb}$ are fixed, then:

$$t \alpha 1/I \qquad \text{(Eq. 5)}$$

$$T_b \alpha 1/I_b \qquad \text{(Eq. 5a)}$$

where I and $I_b$ are the current that is charging or discharging capacitors $C_L$ and $C_{Lb}$, respectively. Equations 4 and 4a show that the time to charge the capacitors to a predetermined level, rising time, or the time to discharge the capacitor to a predetermined level, fall time, is inversely proportional to the current I or $I_b$.

In FIG. 1, the source current $I_{sc}$ that charges the capacitor $C_L$ (110) is provided by active load transistors Q5 (116) and the source current $I_{scb}$ that charges the capacitor $C_{Lb}$ (111) is provided by active load transistor Q4 (115). On the other hand, the sink current $I_{sk}$ that discharges capacitors $C_L$ (110) and $C_{Lb}$ (111) is provided by transistor Q3 (105). In a normal mode of operation of an existing transmitter, the value of the reference voltages $V_{CS}$ and $V_{CS2}$ controls the source and sink currents and these voltages are well characterized and kept constant.

When a voltage $V_{CS2}$ is applied to current sources Q4 (115) and Q5 (116) such that it will become operational in the saturation region it will provide current to Q1 (103) and Q2 (104) in addition to load capacitors $C_L$ (110) and $C_{Lb}$ (111), as indicated by equation-1. So if $V_{in}$ is high relative to $V_{inb}$, then transistor Q1 (104) will also be operating in the saturation region and hence current flows from Q4 (115) through Q1 (103) to Q3 (105). In addition, since transistor Q1 is operating in the saturation region, it will also discharge the load capacitor $C_{Lb}$ (111). In this mode, since $V_{inb}$ is low, transistor Q2 will be in an inactive state and hence there will not be any flow of current through Q2 (114) to Q3 (105). That being the case, the current from Q5 (116) will be used exclusively to charge the load capacitor $C_L$ (110).

The amount of time taken to charge and discharge the capacitors as mentioned above is governed by Eq. 4 and Eq. 4a. In accordance with the present invention, $V_{out}$ is fixed and that the size of capacitor $C_L$ (110) and $C_{Lb}$ (111) are fixed. Thus the time to charge capacitor $C_L$ or $C_{Lb}$ is inversely proportional to the current. Thus, this relationship may be used to provide jitter in accordance with the present invention. By varying the amount of current, the time a signal takes to go from $V_{in}$ to $V_{outb}$, or $V_{inb}$ to $V_{out}$, can be controlled. The larger the current, the less time it will take, and the smaller the current, the more time it will take. So if the output voltage of the voltage source $V_{CS}$ is increased then that will increase the amount of current $I_{sk}$ that will flow through the current sink transistor Q3 (105). This relationship, the current sink $I_{sk}$ and the voltage $V_{CS}$, is governed by Equation 1 above. So when $V_{CS}$ is increased the value of $I_{sk}$ will also increase. Equations 3 and 3a indicate that the time to discharge capacitor $C_L$ or $C_{Lb}$ is inversely proportional to the current, in this case $I_{sk}$. So if $I_{sk}$ is of a larger value then the amount of time to discharge capacitor $C_L$ or $C_{Lb}$ will be smaller. In such a case, a high to low transition at the output will appear to have taken place at an earlier time. On the contrary when the value of the voltage $V_{CS}$ is decreased the value of $I_{sk}$ will become smaller. Consequently, the time to discharge load capacitor $C_L$ or $C_{Lb}$ will be longer. In such a case, a high to low transition at the output will appear to have taken place at a later time. This is illustrated in FIG. 3.

Figure 3:
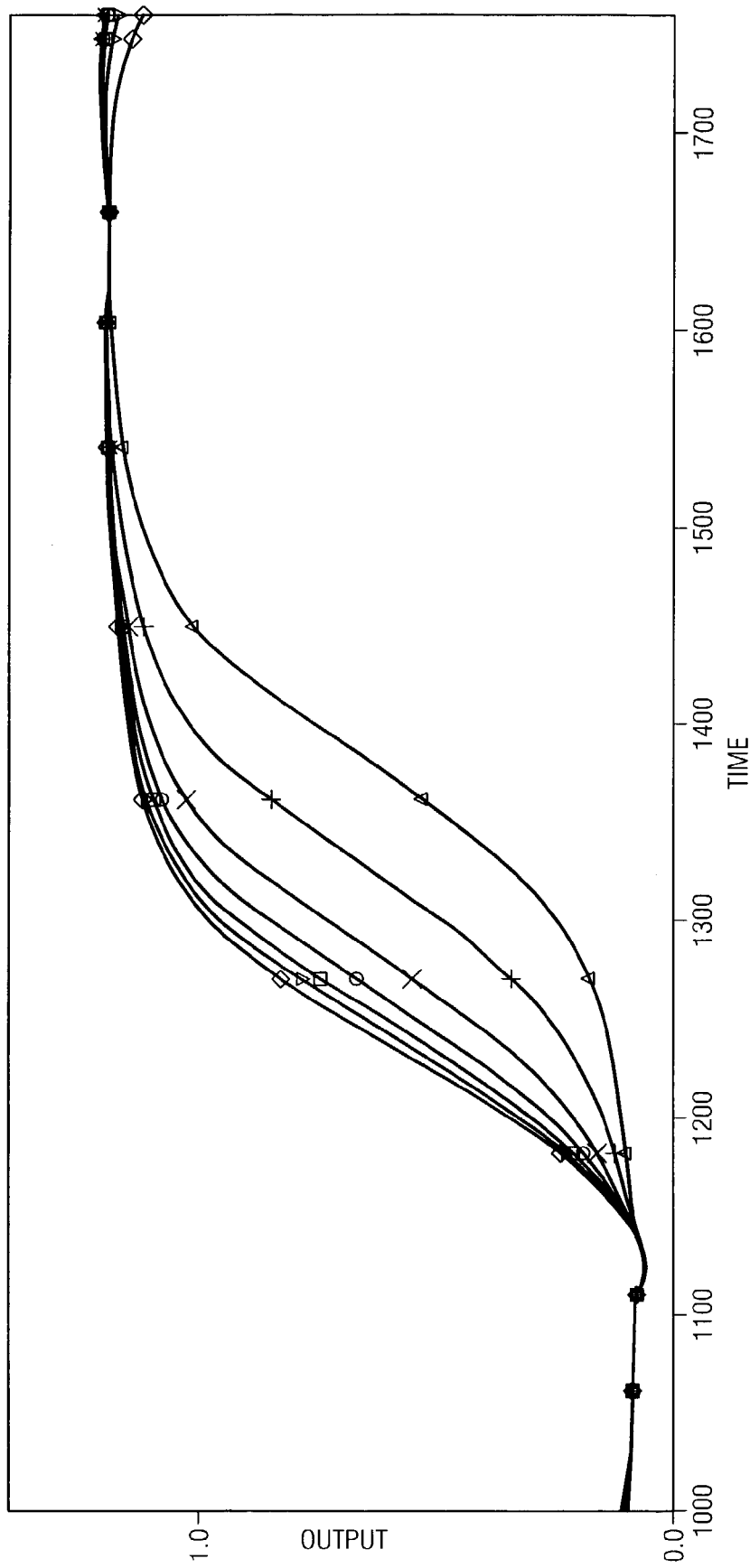
FIG. 3 is a graphical representation of jitter injection in accordance with the present invention.

FIG. 3 graphically shows how the arrival time of the rising edge of the output signal, $V_{out}$ can be varied by changing the values of the reference voltages, $V_{cs2}$. Similarly, the arrival time of the falling edge of the output signal $V_{out}$ can be changed by varying the value of $V_{cs}$. In FIG. 3 the x-axis depicts arrival time of a signal, and the y-axis represents the output current from the output port $V_{out}$.

As the voltage source $V_{CS}$ controls the fall time of the output signal as described above, the voltage source $V_{CS2}$ controls the rise time of the output signal. The voltage source $V_{CS2}$ provides the source current $I_{sc}$ to charge capacitor $C_L$ and $I_{scb}$ to charge capacitor $C_{Lb}$. The relationship of $I_{sc}$ and $I_{scb}$ to $V_{CS2}$ may be governed by Equation 1. Equation 1 shows that the source currents $I_{sc}$ and $I_{scb}$ will increase when voltage $V_{CS2}$ is increased. Equation 3 shows that when $I_{sc}$ and $I_{scb}$ are large, the time to charge capacitor $C_L$ or $C_{Lb}$ will be smaller. In such a case the output signal will transition from low to high at a faster rate. It will appear as if a low to high output signal became available at the output at an earlier time. If on the other hand when voltage $V_{CS2}$ is decreased, equation-1 shows that the source currents $I_{sc}$ and $I_{scb}$ will decrease. Equation-3 shows that when $I_{sc}$ and $I_{scb}$ are small, it will take a longer time to charge capacitor $C_L$ or $C_{Lb}$. Consequently, it will appear as if a low to high output signal became available at the output at an later time.

Thus, according to an embodiment of the present invention, in a test mode, the rise and fall time of output voltages ($V_{out}$ and $V_{outb}$) may be changed by modulating the value of the sink and source reference voltages $V_{CS}$ and $V_{CS2}$. The effect of this variation on the rise and fall time of the output voltage will be injection of jitter into the data stream transmitted by differential output 101. This modulation may be provided by employing modulators 120 and 121 to modulate the output of voltage generators 130 and 131, respectively.

$V_{CS}$ generator 130 and $V_{CS2}$ generator 131 may be comprised of a set of transistors that provide the appropriate voltage $V_{CS}$, to transistor Q3 (105) and voltage $V_{CS2}$ to Q4 (115) and Q5 (116). By controlling or modulating generator 130, the amount of voltage $V_{CS}$ provided to Q3 (105) can be controlled or modulated. In the same way, $V_{CS2}$ generator 131 can be modulated to change the $V_{CS2}$, voltage at Q4 (115) and Q5 (116). This modulation at the generator may be used to introduce jitter. The modulator may take the form of a voltage wave source generating waveforms, such as sine waves, triangular waves, pseudo random binary sequences (PRBS), or other random signals.

In a differential output buffer employing an embodiment of the present invention, the active load transistors Q4 (115) and Q5 (116) may alternatively be replaced with passive loads such as resistors. In such a case, the rise time of the output signal may not be externally controllable. However, the fall time of the output signal may be controlled by modulating $V_{CS}$ to introduce jitter.

Figure 2:
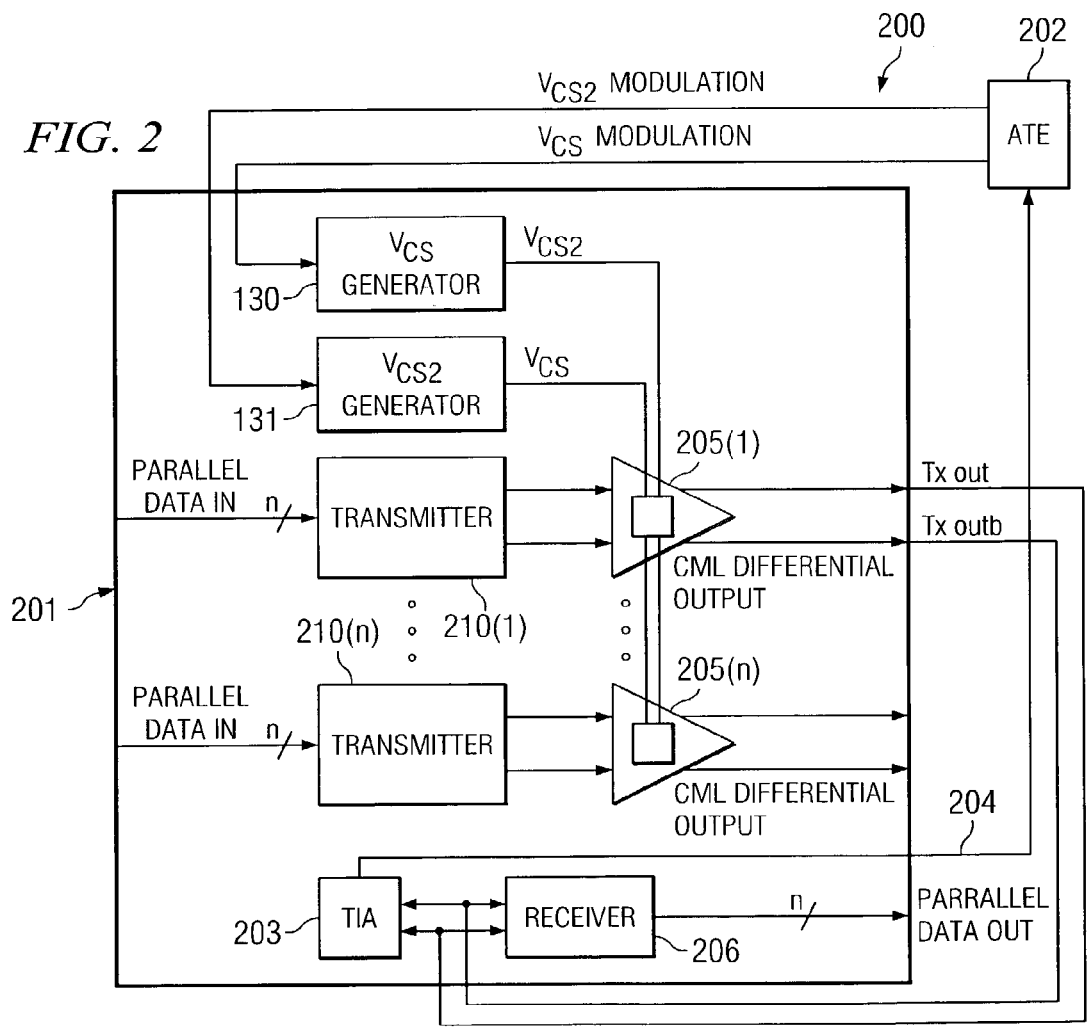
FIG. 2 is a diagrammatic, partial schematic, illustration of a transceiver employing an embodiment of the present jitter injection system and method.

An embodiment of a jitter injection and measurement circuit 200 employed in conjunction with a high speed transceiver 201 and for use with a high speed data stream is shown in FIG. 2. New generation network processors, Internet applications, fiber channel applications and the like, employ many transmitters and receivers within a chip. In this embodiment automatic test equipment (ATE) 202 provides a modulating signal, for a desired type of jitter, to $V_{CS}$ and $V_{CS2}$ generators 130 and 131. Alternatively, a built-in self test (BIST)-circuit may be substituted for ATE 202 module or a combination of a BIST and an ATE may be used. The amount of jitter may be measured by an on-chip timing interval analyzer (TIA) module 203 or other types of jitter measurement techniques, modules or devices. The jitter measurement is preferably fed back to ATE 202 via line 204.

More specifically, FIG. 2 diagrammatically illustrates use of $V_{CS}$ and $V_{CS2}$ modulating signals to modulate $V_{CS}$ and $V_{CS_2}$ generators 130 and 131 which are connected to multiple CML output buffers 205(1–n). Generators 130 and 131 provide jitter to the buffer of each transmitter 210(1)–210(n), simultaneously. Therefore, by controlling one set of generators, several transmitters may be modulated. Thusly, CML buffers 205 (1–N) may be modulated to introduce jitter in an output data stream $Tx-V_{out}$ or $Tx-V_{outb}$. The output data stream is directed into receiver 202. Preferably, a time interval analyzer (TIA) 203 at the front of receiver 206 measures the amount of jitter. TIA 203 returns the value of the jitter at receiver 206, which ATE 202 may use to control modulation. ATE 201 provides a modulated signal to $V_{CS}$ and $V_{CS2}$ generators 130 and 131. Each transmitter may adjust the modulation simultaneously. However, an embodiment of the present invention enables modulating one or fewer transmitters in accordance with the present invention.

FIG. 2 shows jitter injected at the final output stage of transmitters 210(1)–210(n). However, it is not necessary that the jitter be injected only at the final output stage. Depending on the application, jitter may be selectively injected anywhere in the data and/or clock path by modulating the rise and fall times of one or more appropriate intermediate differential buffers, in accordance with the present invention.

A minimum amount of hardware is required on a chip to provide a jitter testing mechanism in accordance with the present invention. The present invention may be incorporated at the transmitter output(s), and all the modulating voltage is provided by ATE 202. Advantageously, minimal overhead costs are involved for a chip incorporating the present systems and methods for injection of test jitter in a data bit stream. A CML buffer is typically already part of the transmitter output buffers for most chips employing high speed transmitters or transceivers. A control to an outside ATE enables the ATE to provide the modulating signal in accordance with the present invention.

Turning to FIG. 4, method 400 for jitter injection in a data bit stream in accordance with an embodiment of the present invention is flow charted. At 401 a first voltage generator modulates a first control voltage to control the rise time of an output signal. A second voltage generator modulates a second control voltage to control the fall time of the output signal at box 402. A differential pair receives a pair of input voltages. See box 403. A current sink device is operated using a control voltage provided by one of the generators to provide an output voltage in response to the input voltages received by the differential pair at box 404. At 405 current sources provide the output signal using a reference voltage provided by one of the generators in response to the input voltages received by the differential pair. Thusly, jitter is provided in the output signal as detailed in box 406. Specifically, simultaneous variation of the rise and fall times of the output signal and the input voltages define the output signal and jitter output by the current sinks and the current sources.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for injecting test jitter in a data bit stream comprising:
    modulating a first voltage generator to control a rise time of an output signal;
    modulating a second voltage generator to control a fall time of said output signal;
    receiving a pair of input voltages by a differential pair;
    operating at least one current sink device with a first control voltage provided by at least one of said voltage generators to provide an output voltage in response to said input voltages received by said differential pair; and
    operating a plurality of current sources to provide said output signal using a reference voltage provided by one of said voltage generators in response to said input voltages received by said differential pair, wherein simultaneous variation of the rise and fall times together with said input voltages define said output signal and jitter output by said current sink device and said current sources.

2. The method of claim 1 wherein characteristics of said jitter are determined by said modulating a first voltage generator and said modulating a second voltage generator.

3. The method of claim 2 wherein said characteristics include, at least in part, a frequency of said jitter.

4. The method of claim 2 wherein said characteristics include, at least in part, an amplitude of said jitter.

5. The method of claim 2 wherein said characteristics include, at least in part, a type of said jitter.

6. The method of claim 5 wherein said type of said jitter is at least one type of jitter selected from a group of types of jitter consisting of:
    in-band jitter;
    out-of-band jitter;
    sinusoidal wave form jitter;
    pattern dependent jitter;
    phase dependent jitter; and
    interference dependent jitter.

7. The method of claim 1 wherein said output signal is output to a receiver.

8. The method of claim 1 wherein said output signal is output to a jitter measurement module.

9. The method of claim 8 wherein said jitter measurement module comprises a time interval analyzer.

10. The method of claim 1 wherein said output signal is output, in parallel, to a receiver and a jitter measurement module.

11. The method of claim 1 wherein said modulating is carried out by an external automatic testing equipment circuit.

12. The method of claim 11 further comprising feeding-back information about test jitter from a jitter measurement module to said automatic test equipment circuit.

13. The method of claim 1 wherein said modulating is carried out by a built-in self test circuit.

14. The method of claim 13 further comprising feeding-back information about test jitter from a jitter measurement module to said built-in test circuit.

15. The method of claim 1 further comprising receiving, storing and discharging said output voltage.

16. A system for injecting test jitter in one or more independent data bit streams, said system comprising:
    at least one modulator;
    a plurality of voltage generators, each of said voltage generators modulated by said modulator;
    a differential pair, a first output voltage of said differential pair controlled by a first input voltage, a second output voltage of said differential pair controlled by a second input voltage;
    a current sink device for each data bit stream, each said current sink device operated by a first control voltage provided by a first of said voltage generators, each current sink device providing said first and second output voltages in response to said first and second input voltages provided to said differential pair; and
    a plurality of current source devices controlled by a second control voltage provided by a second of said voltage generators, each of said current source devices providing an output voltage in response to said first and second input voltages provided to said differential pair, each of said current source devices and each said current sink device providing said first and second output voltages in response to said first and second input voltages provided to said differential pair, wherein simultaneous variation of said first and second control voltages in combination with said first and second input voltages injects jitter into said first and second output voltages.

17. The system of claim 16 further comprising a plurality of load capacitors, each receiving, storing and discharging one of said output voltages.

18. The system of claim 16 wherein said at least one modulator comprises an external automatic test equipment circuit.

19. The system of claim 16 wherein said at least one modulator comprises a built-in self test circuit.

20. The system of claim 16 further comprising a jitter measurement device monitoring said output voltages.

21. The system of claim 20 wherein said jitter measurement device comprises a timing interval analyzer.

22. The system of claim 20 wherein said jitter measurement device feeds back information about test jitter to said at least one modulator.

23. The system of claim 20 wherein said jitter measurement device is connected in parallel with a receiver input.

24. The system of claim 16 wherein at least one transceiver, said voltage generators, said current sink device, said differential pair and said current source devices comprise, at least in part, a communication device.

25. The system of claim 16 wherein said current sink device, said differential pair and said current source devices comprise, at least in part, an output buffer of a transmitter.

26. The system of claim 16 wherein said devices are transistors.

27. The system of claim 16 wherein characteristics of said jitter are determined by modulating said voltage generators.

28. The system of claim 27 wherein said characteristics include, at least in part, a frequency of said jitter.

29. The system of claim 27 wherein said characteristics include, at least in part, an amplitude of said jitter.

30. The system of claim 27 wherein said characteristics include, at least in part, a type of said jitter.

31. The system of claim 30 wherein said type of said jitter is at least one type of jitter selected from a group of types of jitter consisting of:
    in-band jitter;
    out-of-band jitter;
    sinusoidal wave form jitter;
    pattern dependent jitter;
    phase dependent jitter; and
    interference dependent jitter.

32. A circuit adapted to inject test jitter in one or more independent data bit streams, said circuit comprising:
    at least one modulator;
    a plurality of voltage generators each of said voltage generators modulated by at least one of said modulators; and
    a transmitter output buffer comprising:
        a differential pair, a first output voltage of said differential pair controlled by a first input voltage, a second output voltage of said differential pair controlled by a second input voltage;
        a current sink device for each data bit stream, each said current sink device operated by a first control voltage provided by a first of said voltage generators, each current sink device providing said first and second output voltages in response to said first and second input voltages provided to said differential pair;
        a plurality of load capacitors, each receiving, storing and discharging one of said first and second output voltages; and
        7 a plurality of current source devices controlled by a second control voltage provided by a second of said voltage generators each of said current source devices providing an output voltage in response to said first and second input voltages provided to said differential pair, each of said current source devices and each current sink device providing said first and second output voltages in response to said first and second input voltages provided to said differential pair, wherein simultaneous variation of said first and second control voltages in combination with said first and second input voltages injects jitter into said first and second output voltages.

33. The circuit of claim 32 further comprising a jitter measurement device monitoring said first and second output voltages and feeding back information about test jitter to said at least one modulator.

34. The circuit of claim 33 wherein said circuit is a transceiver and said first and second output voltages is fed to a receiver of said transceiver and said jitter measurement device is connected in parallel with an input of said receiver.

35. The circuit of claim 33 wherein said jitter measurement device comprises a timing interval analyzer.

36. The circuit of claim 32 wherein said at least one modulator comprises an external automatic test equipment circuit.

37. The circuit of claim 32 wherein said at least one modulator comprises a built-in self test circuit.

* * * * *